United States Patent
Albers (10) Patent No.: US 9,522,551 B2
(45) Date of Patent: Dec. 20, 2016

(54) CONVEYING BELT ASSEMBLY FOR A PRINTING DEVICE

(71) Applicant: OCÉ-TECHNOLOGIES B.V., Venlo (NL)

(72) Inventor: Antonius G. H. Albers, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/824,791

(22) Filed: Aug. 12, 2015

(65) Prior Publication Data

US 2016/0059584 A1    Mar. 3, 2016

(30) Foreign Application Priority Data

Aug. 26, 2014    (EP) .................................... 14182318

(51) Int. Cl.
| | |
|---|---|
| *B41J 11/00* | (2006.01) |
| *B65H 5/02* | (2006.01) |
| *B65H 7/10* | (2006.01) |
| *B65G 15/28* | (2006.01) |
| *B65G 15/62* | (2006.01) |
| *B65G 15/64* | (2006.01) |

(52) U.S. Cl.
CPC .............. *B41J 11/007* (2013.01); *B65G 15/28* (2013.01); *B65G 15/62* (2013.01); *B65G 15/64* (2013.01); *B65H 5/021* (2013.01); *B65H 7/10* (2013.01); *B65H 2404/25* (2013.01); *B65H 2511/20* (2013.01); *B65H 2511/24* (2013.01); *B65H 2553/42* (2013.01); *B65H 2701/1315* (2013.01)

(58) Field of Classification Search
CPC ........ B41J 11/007; B65G 15/64; B65G 15/62; B65G 15/28; B65H 5/021; B65H 7/10; B65H 2404/25; B65H 2511/24; B65H 2701/1315; B65H 2511/20; B65H 2553/42

See application file for complete search history.

(56) References Cited

U.S. PATENT DOCUMENTS

| | | |
|---|---|---|
| 2007/0267274 A1 | 11/2007 | Steffen et al. |
| 2009/0145729 A1 | 6/2009 | Enomoto |
| 2013/0222456 A1 | 8/2013 | Ogawa |

FOREIGN PATENT DOCUMENTS

| | | |
|---|---|---|
| DE | 10 2011 100 436 A1 | 11/2011 |
| EP | 40 24 357 A1 | 2/1992 |
| EP | 1 857 288 A2 | 11/2007 |
| WO | WO 2012/021059 A1 | 2/2012 |

*Primary Examiner* — Henok Legesse
(74) *Attorney, Agent, or Firm* — Birch, Stewart, Kolasch & Birch, LLP (57) ABSTRACT

The present invention relates to a conveying belt assembly for a printing device. The assembly comprises an endless conveyor belt having a conveying part and a return part; an upstream and downstream sliding support having a surface curved in rotational direction of the conveyor belt; a driving roller arranged downstream of the conveying part in urging contact with the conveyor belt; a friction element arranged upstream of the conveying part in urging contact with the conveyor belt for tensioning the conveying part; and a control system for controlling the position of the conveying part with respect to the transverse direction. The control system comprises: a position sensing device; an upstream and/or downstream actuator device for moving the conveying part in transverse direction; and a controller for transmitting control signals, generated by the controller on the basis of the sensor signals, to the upstream and downstream actuator.

14 Claims, 4 Drawing Sheets

CONVEYING BELT ASSEMBLY FOR A PRINTING DEVICE

FIELD OF THE INVENTION

The present invention relates to a conveying belt assembly for a printing device, a method for controlling the position of an endless conveyor belt, and the use of a conveying belt assembly.

BACKGROUND OF THE INVENTION

In printing devices conveying belts are used to transport a sheet of paper through the printing device. The sheet of paper transported through the printing device requires high accuracy in control of its position.

OBJECT OF THE INVENTION

The present invention has as its object to provide a conveying belt assembly for a printing device, which conveying belt assembly allows very accurate control of the position of the conveyor belt or its conveying part.

SUMMARY OF THE INVENTION

According to the invention, this object is achieved by providing a conveying belt assembly for a printing device, comprising:
  an endless conveyor belt having a conveying part and a return part; wherein a rotational direction is defined by the conveying direction of the endless conveyor belt and a transverse direction is defined as a direction extending perpendicular to the rotational direction;
  two sliding supports having a surface curved in rotational direction of the conveyor belt; one sliding support being arranged at the downstream end of the conveying part defining the downstream transition between the conveying part and the return part, the other sliding support being arranged at the upstream end of the conveying part defining the upstream transition between the conveying part and the return part;
  a driving roller arranged downstream of the conveying part in urging contact with the conveyor belt;
  a friction element arranged upstream of the conveying part in urging contact with the conveyor belt for tensioning the conveying part;
  a control system for controlling the position of the conveying part with respect to the transverse direction;
  wherein the control system comprises:
    a position sensing device for sensing the position of the conveying part with respect to the transverse direction and/or the position of an object transported or to be transported by the conveying part with respect to the transverse direction;
    at least one actuator device, like an upstream actuator device and/or a downstream actuator device, said actuator device being adapted for moving the conveying part in transverse direction;
    a controller which is, on the one hand, operatively connected with the position sensing device for receiving sensor signals representing one or more of said sensed positions and, on the other hand, operatively connected with, respectively, the upstream and downstream actuator device for transmitting control signals, generated by the controller on the basis of the sensor signals, to the upstream and downstream actuator.

Due to the sliding supports there is low friction between the supports and the conveyor belt. The conveyor belt therefore might easily drift sideways in a direction transverse to the conveying direction. Which is a unwanted characteristic of a conveyor belt guided around sliding supports in case position control of the objects transported is required. However, according to the invention this low friction in a direction transverse to the conveying direction is used to obtain an accurate control of the position of the conveying part of the belt and/or of the position of the object transported or to be transported. The conveying belt assembly according to the invention allows for direct control of the position of the conveying part of the conveyor belt. Further, the control algorithm is much less complicated and the use of many costly accurate parts can be avoided due to the direct control.

The position sensing device of the assembly according to the invention can be realized in many manners already known to the skilled man. For example a camera, CCD etcetera can be used on the edge of the belt or on a pattern provided on the belt in order to measure the position of the belt in transverse direction.

The upstream and/or downstream actuator devices of the assembly according to the invention can be realized in several manners within the scope of the invention as follows from the claims. According to a further embodiment of the invention, wherein the actuator devices comprises one or more from the following group:
  one or more actuator devices adapted for applying magnetic forces to the conveyor belt, like to the conveying part of the conveyor belt, said magnetic forces acting in transverse direction of the conveyor belt which comprises a material susceptible for magnetic forces;
  one or more actuator devices adapted to adjust the angle of the rotational axis of the driving roller element with respect to the transverse direction;
  one or more pusher assemblies comprising a pusher on each side of the conveyor belt, each pusher being adapted to push against a lateral side of the conveyor belt, like to the lateral side of the conveying part of the conveyor belt;
  one or more vacuum devices arranged against the inner side of the endless conveyor belt and adapted for movement in transverse direction of the conveyor belt.

A magnetic force can be used when the conveyor belt comprises a material susceptible for magnetic forces. Such a material will in general be a magnetic or magnetizable material, like Fe or a suitable Fe alloy. This material can for example be present in the form of reinforcement wires of the conveying belt. Another manner of adjusting the transverse position of the conveying part is by adjusting the angle of the rotational axis of the driving roller. Still another manner is using pusher elements on opposing sides of the conveyor belt. These pushing elements allow easy control of the transverse position of the belt just by pushing in the correct direction. Also a gripper, like a vacuum device, might be used to grip the conveyor belt and move it in transverse direction. As will be clear other actuator devices are conceivable as well.

The conveyor belt assembly according to the invention might further be provided with both an upstream and a downstream actuator device, wherein the upstream actuator device and downstream actuator device might be of the same type or might be of different type. By providing both an upstream and downstream actuator device, it is possible to move the entire conveying part a specific distance in transverse direction by acting on both ends of the conveying part.

According to a further embodiment of the invention, the conveying belt assembly might further comprises a plate, like a print surface plate or vacuum plate, arranged parallel to the conveying part on the inner side of the endless conveyor belt. Such a plate provides support to the conveying part and in case of a vacuum plate it assists in keeping the object transported—in general a sheet of paper which is treated or is to be treated —. According to the invention, the assembly is especially of the so called sliding conveyor belt type. A sliding conveyor belt is a belt guided all around sliding surfaces, i.e. surfaces with respect to which the belt slides when passing the surface. In general a sliding conveyor belt has no support surfaces moving together with the belt part passing along it.

According to a further embodiment of the invention, the conveyor belt might be wrapped around said two sliding supports and a plate arranged parallel to the conveying part on the inside of the conveyor belt; wherein the return part of the conveyor belt, extending from the downstream sliding support up to the upstream sliding support, is freely hanging. This allows easy control of the transverse position of the conveying part as the return part simply follows transverse movement of the conveying part, without being hindered by supports or guides. This design also keeps the number of bends in the belt minimal, resulting in longer lifetime of the belt.

The inside of an endless conveyor belt is in this application defined as the inside of the endless loop, i.e. the side of the conveyor belt where the conveying part faces the return part and vice versa.

According to a further embodiment of the invention, the sliding supports might have a supporting surface comprising a plastic, like PE (polyethene or polyethylene) or UHMWPE (Ultra-high-molecular-weight polyethylene). Plastics allow in general low friction in an easy manner.

According to a further embodiment of the invention, the sliding supports might comprise an air bearing.

According to a further embodiment of the invention, the driving roller might be arranged opposite the downstream sliding support for cooperation with the downstream sliding support. The driving roller will be pressed against the outside of the belt part passing the downstream sliding support.

According to a further embodiment of the invention, the friction element is arranged opposite the upstream sliding support for cooperation with the upstream sliding support. The friction element will be pressed against the outside of the belt part passing the upstream sliding support. The friction element might be a stationary element pressed against the belt surface, but it might also be a rotating element providing friction due to resistance against rotation of the rotating element.

According to a further aspect, the invention relates to a printer device, comprising a conveying belt assembly according to the invention, and further comprising one or more from the following group:
an inkjet marking module;
a drying and/or fixing unit;
a storage for paper to be printed;
a receptacle for printed paper.

According to still a further aspect, the invention relates to a method for controlling the position of an endless conveyor belt of a printing device, wherein the endless conveyor belt is a sliding belt wrapped around two sliding, one of the sliding supports being arranged at the downstream end of the conveying part defining the downstream transition between the conveying part and the return part, the other of the sliding supports being arranged at the upstream end of the conveying part defining the upstream transition between the conveying part and the return part; wherein the method comprises the step of applying a force to the conveying part, which force acts in transverse direction of the conveyor belt.

According to again a still further aspect, the invention relates to the use of a conveying belt assembly according to the invention in order to control the position of a conveyor belt of a printing device.

BRIEF DESCRIPTION OF THE DRAWINGS

The present invention will become more fully understood from the detailed description given herein below and accompanying schematical drawings which are given by way of illustration only and are not limitative of the invention, and wherein:

FIG. 2 shows a schematic representation of an inkjet marking device: A) and B) assembly of inkjet heads; C) detailed view of a part of the assembly of inkjet heads.

DETAILED DESCRIPTION OF THE DRAWINGS

Printing process

Figure 1:
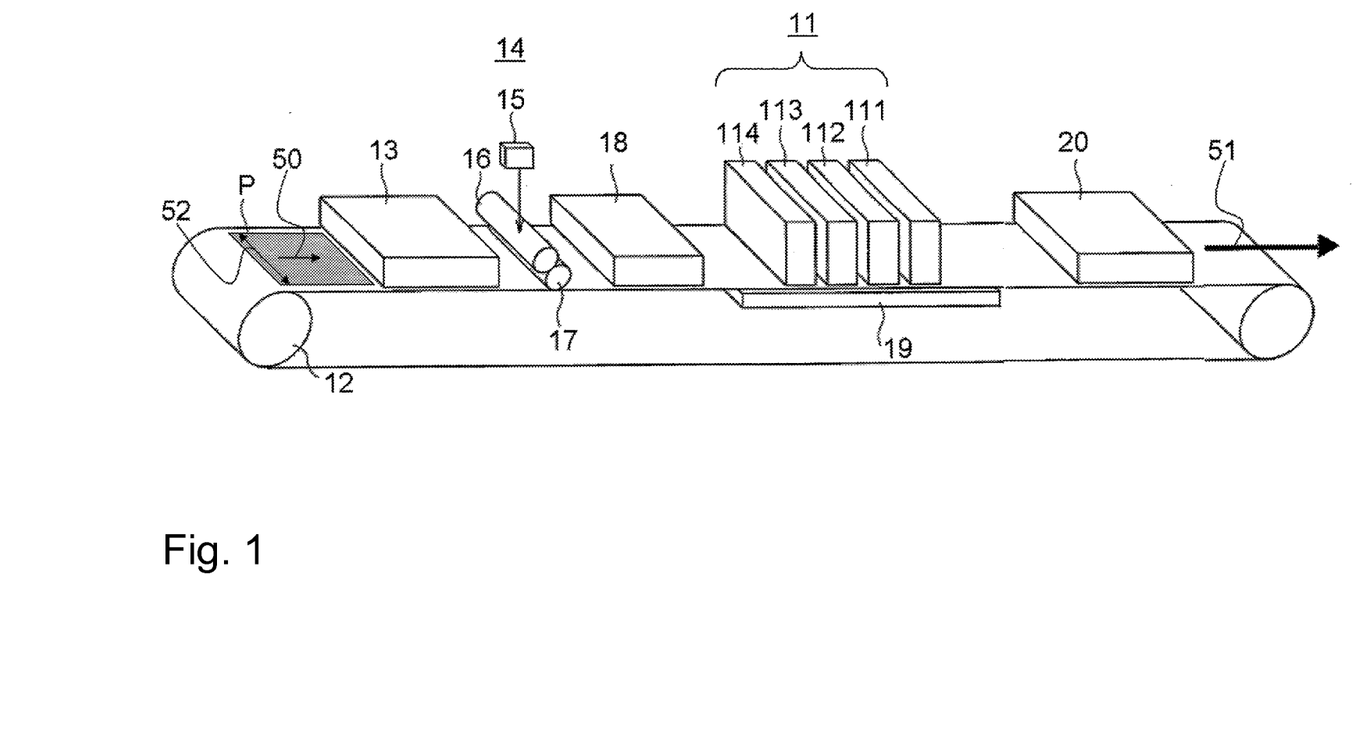
FIG. 1 shows a schematic representation of an inkjet printing system.
Figure 2A:
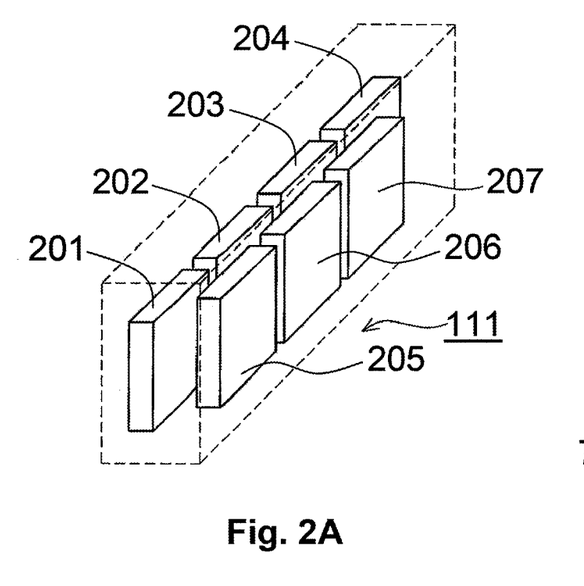
Figure 2B:
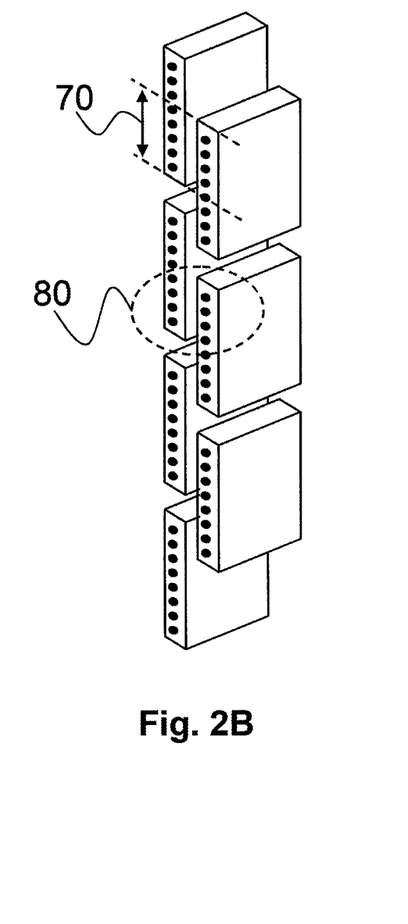
Figure 2C:
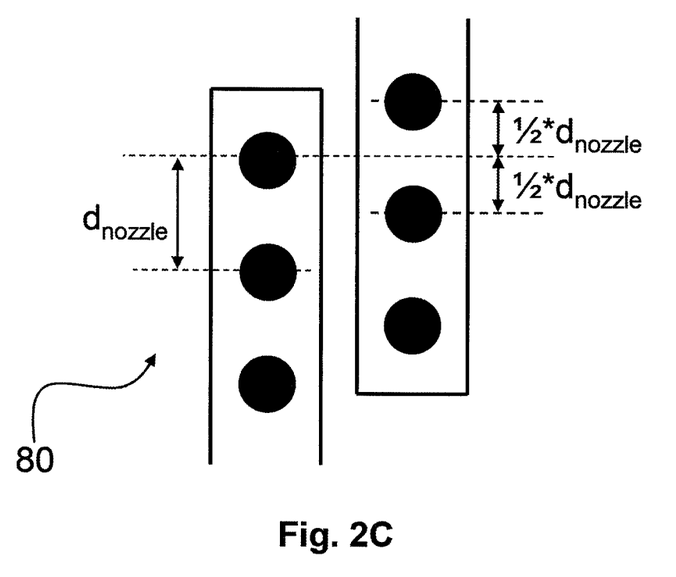

A printing process is described with reference to the appended drawings shown in FIG. 1 and FIG. 2. FIGS. 1 and 2 show schematic representations of an inkjet printing system and an inkjet marking device, respectively.

FIG. 1 shows that a sheet of a receiving medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises the following steps: media pre-treatment, image formation, drying and fixing and optionally post treatment.

Media Pre-treatment

To improve the spreading and pinning (i.e. fixation of pigments and water-dispersed polymer particles) of the ink on the receiving medium, in particular on slow absorbing media, such as machine coated media, the receiving medium may be pretreated, i.e. treated prior to printing an image on the medium. The pre-treatment step may comprise one or more of the following:
preheating of the receiving medium to enhance spreading of the used ink on the receiving medium and/or to enhance absorption of the used ink into the receiving medium;

primer pre-treatment for increasing the surface tension of receiving medium in order to improve the wettability of the receiving medium by the used ink and to control the stability of the dispersed solid fraction of the ink composition (i.e. pigments and dispersed polymer particles). Primer pre-treatment may be performed in the gas phase, e.g. with gaseous acids such as hydrochloric acid, sulfuric acid, acetic acid, phosphoric acid and lactic acid, or in the liquid phase by coating the receiving medium with a pre-treatment liquid. The pre-treatment liquid may comprise water as a solvent, one or more cosolvents, additives such as surfactants and at least one compound selected from a polyvalent metal salt, an acid and a cationic resin;

corona or plasma treatment.

Primer Pre-treatment

As an application way of the pre-treatment liquid, any conventionally known methods can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating (see 14 in FIG. 1) method is preferable because this coating method does not need to take into consideration of ejection properties and it can apply the pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply a pre-treatment liquid to the entire surface of a coated printing paper, and roller coating can be preferably used as a coating method to the whole surface. The pre-treatment liquid may be an aqueous pre-treatment liquid.

Corona or Plasma Treatment

Corona or plasma treatment may be used as a pre-treatment step by exposing a sheet of a receiving medium to corona discharge or plasma treatment. In particular when used on media like polyethylene (PE) films, polypropylene (PP) films, polyetyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbondioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the receiving medium P. Subsequently, the coated printing paper P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

An inkjet marking device for use in single pass inkjet printing, 111, 112, 113, 114, has a length, L, of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 μm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater.

After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process.

In an embodiment, the prints may be post treated by laminating the prints.

In an embodiment, the post-treatment step comprises a step of applying (e.g. by jetting) a post-treatment liquid onto the surface of the coating layer, onto which the inkjet ink has been applied, so as to form a transparent protective layer on the printed recording medium. In the post-treatment step, the post-treatment liquid may be applied over the entire surface of an image on the recording medium or may be applied only to specific portions of the surface of an image. The method of applying the post-treatment liquid is not particularly limited, and is selected from various methods depending on the type of the post-treatment liquid. However, the same method as used in the coating method of the pre-treatment liquid or an inkjet printing method is preferably used. Of these methods, inkjet printing method is particularly preferable in view of, avoiding contact between the printed image and the used post-treatment liquid applicator; the construction of an inkjet recording apparatus used; and the storage stability of the post-treatment liquid. In the post-treatment step, a post-treatment liquid containing a transparent resin is applied on the surface of a formed image so that a dry adhesion amount of the post-treatment liquid is 0.5 $g/m^2$ to 10 $g/m^2$, preferably 2 $g/m^2$ to 8 $g/m^2$, thereby forming a protective layer on the recording medium. When the dry adhesion amount is less than 0.5 $g/m^2$, almost no improvement in image quality (image density, color saturation, glossiness and fixability) is obtained. When the dry adhesion amount is more than 10 $g/m^2$, it is disadvantageous in cost efficiency, because the dryness of the protective layer degrades and the effect of improving the image quality is saturated.

As a post-treatment liquid, an aqueous solution comprising components capable of forming a transparent protective layer over a recording medium (e.g. a water-dispersible resin, a surfactant, water, and additives as required) is preferably used. The water-dispersible resin comprised in the post-treatment liquid, preferably has a glass transition temperature ($T_g$) of −30° C. or higher, and more preferably in the range of −20° C. to 100° C. The minimum film forming temperature (MFT) of the water-dispersible resin is preferably 50° C. or lower, and more preferably 35° C. or lower. The water-dispersible resin may be radiation curable to improve the glossiness and fixability of the image.

As the water-dispersible resin, for example, an acrylic resin, a styrene-acrylic resin, a urethane resin, an acrylsilicone resin, a fluorine resin and the like are preferably used. The water-dispersible resin can be suitably selected from the same materials as that used for the inkjet ink. The amount of the water-dispersible resin contained, as a solid content, in the protective layer is preferably 1% by mass to 50% by mass.

The surfactant comprised in the post-treatment liquid is not particularly limited and may be suitably selected from those used in the inkjet ink. Examples of the other components of the post-treatment liquid include antifungal agents, antifoaming agents, and pH adjustors.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

The printing process and device described up to here with reference to FIGS. 1 and 2 is an example of a process/device in which the present invention can be applied. The present invention itself has not yet been addressed in the above description of FIG. 1 and. The present invention itself will be explained in more detail below with reference to FIGS. 3 and 4. It is however to be noted that the different parts of the printing process/device described above and shown in FIGS. 1 and 2 might be combined with the present invention alone—i.e. separate from other parts—or in combination with other parts described above in relation to FIGS. 1 and 2. For example it will be clear that each transportation mechanism of FIGS. 1 and 2 might be implemented as a conveying belt assembly according to the invention. It is also very well conceivable to split a transportation mechanism of FIGS. 1 and 2 into a multiple of subsequent conveyor systems which all or in part might be implemented as a conveying belt system according to the invention.

Figure 3:
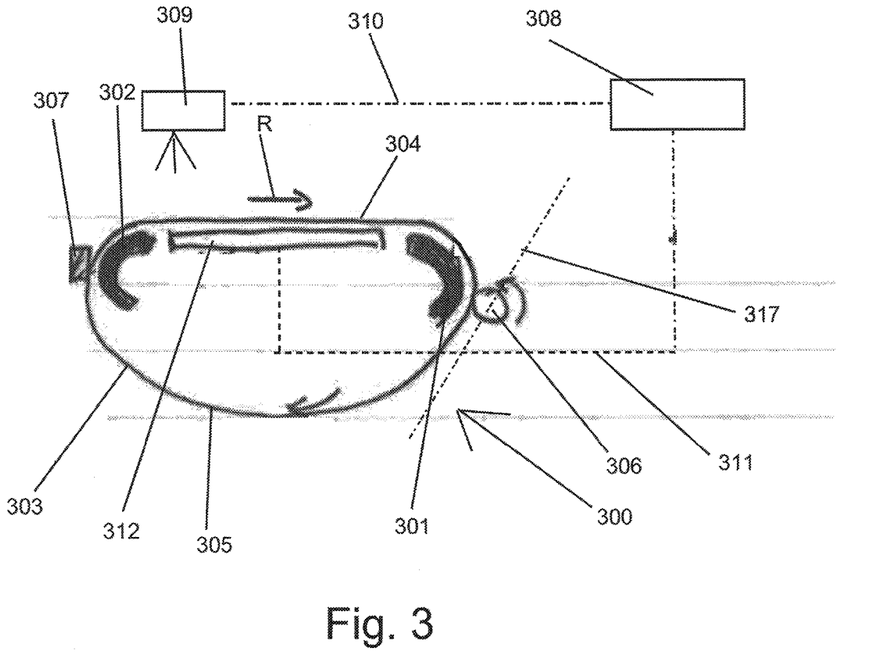
FIG. 3 shows schematically a conveying belt assembly according to the invention.
Figure 4:
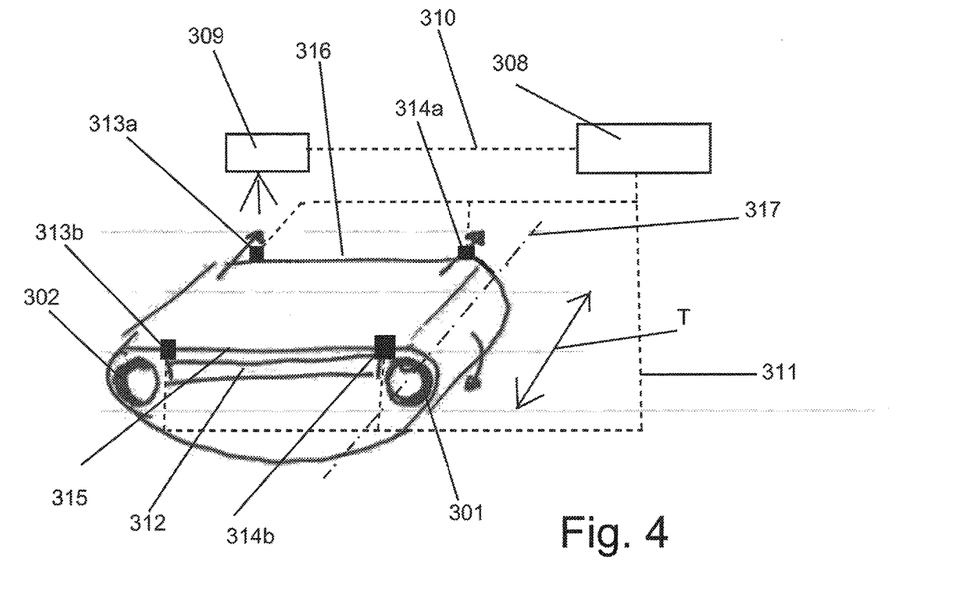
FIG. 4 shows schematically a perspective view of the conveying belt assembly according to the invention.

In FIG. 4, the driving roller 306 and friction element 306 are not shown for clarity reasons, but it will be clear that those might be present in similar manner as shown in FIG. 3. Further in FIG. 4 similar reference numbers have been used for parts similar to those parts of FIG. 3.

FIG. 3 shows schematically a conveying belt assembly 300 according to the invention. This assembly comprises an endless conveyor belt 303 having a conveying part 304 and a return part 305. The rotational direction of the conveyor belt 303 is defined by the conveying direction R and a transverse direction T (FIG. 4) is defined as the direction perpendicular to arrow R and parallel to the conveyor belt.

The endless conveyor belt 303 is wrapped around two sliding supports 301 and 302. Sliding support 301 is arranged downstream of the conveying part 304 and called downstream sliding support. Sliding support 302 is arranged upstream of the conveying part. The terms downstream and upstream are in this application defined with respect to the conveying direction R. The transition between the conveying part and the return part is defined by the downstream and upstream sliding support 301 and 302.

In order to drive the conveyor belt 303, the assembly further comprises a driving roller 306. This driving roller 306 is arranged downstream of the conveying part 304 and is, during use, in urging contact with the outside of the conveyor belt 303. The driving roller cooperates in this example with the downstream sliding support 301, but cooperation with another passive roller or another actively driven driving roller on the inside of the conveyor belt is possible as well. In order to ensure that the conveying part is tensioned a friction element 307 is arranged upstream of the conveying part 304.

In order to ensure sufficient tension in the conveying part 304 of the belt 303, a friction element 307 is provided upstream of the conveying part. This friction element 307 is in urging contact with the conveyor belt. This friction element 307 might be a stationary element pressed against the outside of the conveyor belt 303 and cooperating with the upstream sliding support 302. The friction element can however also be designed differently. It might be a rotating element cooperating with the upstream sliding support or with another element arranged on the inside of the conveyor belt 303. The return part 305 is freely hanging between the downstream and upstream sliding support.

In order to control the position of the conveying part 304 of the endless belt 303 with respect to the transverse direction T, the assembly according to the invention comprises a control system.

The control system comprises a position sensing device 309 adapted to sense the position of the conveying part 304 with respect to the transverse direction. This sensing device 309 might comprise a camera or CCD or other sensor which measures the position of a side edge of the conveying part of the belt and/or of a pattern or marking provided on the belt 303. Alternatively or supplementary, the camera or CCD or other sensor might also measure the position of a sheet of receiving medium, like a sheet of paper. This position of the sheet of receiving medium might already be measured before this sheet of receiving medium is introduced onto the conveyor belt of the assembly according to the invention.

The control system further comprises a controller 308. This controller 308 is on the one hand operatively connected—by wire 310—with the position sensing device 309 in order to receive sensor signals representing a position sensed by the position sensing device 309, and is on the other hand operatively connected—by wire 311—with at least one actuator device, to be discussed below. The actuator device receives a control signal generated by the controller on the basis of amongst others the sensor signal(s) received from the at least one sensing device. It is to be noted that operatively connected encompasses, according to the present invention, wire connections as well as wireless connections.

The at least one actuator device might comprise a vacuum plate 312 arranged against the inner side of the conveying part 304 of the endless conveyor belt 303. By shifting this vacuum plate 312 in transverse direction, the position of the conveying part with respect to the transverse direction T can be controlled as the vacuum plate might firmly grip the conveying part.

Instead of or supplementary to the vacuum plate 312, the at least one actuator device according to the invention might also comprise a device applying a magnetic force to the conveying part of the actuator device. This can be achieved by providing the belt with magnetic or magnetizable material, like Fe or an Fe alloy and providing, for example, the plate 312 with electro magnets. In this case the plate 312 might be a vacuum plate or a regular support plate without any vacuum.

Instead of or supplementary to the vacuum plate 312 and/or the plate 312 able to apply magnetic forces, the actuator device might comprise one or more pusher assemblies 313a, 313b, 314a, 314b, each comprising a pusher on each side of the conveyor belt 303. Each pusher of a pusher assembly is adapted to push against a lateral side 315, 316 of the conveyor belt.

Instead of or supplementary to the vacuum plate 312 and/or the plate 312 able to apply magnetic forces, and/or the pusher elements, the actuator device might be adapted to adjust the angle of the rotational axis 317 of the driving roller element with respect to the transverse direction.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A conveying belt assembly for a printing device, comprising:
    an endless conveyor belt having a conveying part and a return part; wherein a rotational direction is defined by the conveying direction of the endless conveyor belt and a transverse direction is defined as a direction extending perpendicular to the rotational direction;
    two sliding supports having a surface curved in rotational direction of the conveyor belt; one sliding support being arranged at the downstream end of the conveying part defining the downstream transition between the conveying part and the return part, the other sliding support being arranged at the upstream end of the conveying part defining the upstream transition between the conveying part and the return part;
    a driving roller arranged downstream of the conveying part in urging contact with the conveyor belt;
    a friction element arranged upstream of the conveying part in urging contact with the conveyor belt for tensioning the conveying part;
    a control system for controlling the position of the conveying part with respect to the transverse direction;
    wherein the control system comprises:
        a position sensing device for sensing the position of the conveying part with respect to the transverse direction;
        at least one actuator device, said at least one actuator device being adapted for moving the conveying part in transverse direction;
        a controller which is, operatively connected with the position sensing device for receiving sensor signals representing one or more of said sensed positions and operatively connected with the at least one actuator device for transmitting control signals, generated by the controller on the basis of the sensor signals, to the at least one actuator device.

2. The conveying belt assembly according to claim 1, wherein the at least one actuator device comprises one or more from the following group:
    one or more actuator devices adapted for applying magnetic forces to the conveyor belt, like to the conveying part of the conveyor belt, said magnetic forces acting in transverse direction of the conveyor belt;
    one or more actuator devices adapted to adjust the angle of the rotational axis of the driving roller element with respect to the transverse direction;
    one or more pusher assemblies comprising a pusher on each side of the conveyor belt, each pusher being adapted to push against a lateral side of the conveyor belt, like to the lateral side of the conveying part of the conveyor belt;
    one or more vacuum devices arranged against the inner side of the endless conveyor belt and adapted for movement in transverse direction of the conveyor belt.

3. The conveying belt assembly according to claim 1, wherein the at least one actuator device comprises an upstream actuator device and a downstream actuator device.

4. The conveying belt assembly according to claim 3, wherein the upstream and downstream actuator devices are of the same type.

5. The conveying belt assembly according to claim 3, wherein the upstream and downstream actuator devices are of a different type.

6. The conveying belt assembly according to claim 1, wherein the assembly further comprises a plate arranged parallel to the conveying part on the inner side of the endless conveyor belt.

7. The conveying belt assembly according to claim 1, wherein the assembly is of the sliding conveyor belt type.

8. The conveying belt assembly according to claim 1, wherein the conveyor belt is wrapped around said two sliding supports and a plate arranged parallel to the conveying part on the inside of the conveyor belt; and wherein the return part of the conveyor belt, extending from the downstream sliding support up to the upstream sliding support, is freely hanging.

9. The conveying belt assembly according to claim 1, wherein the sliding supports have a supporting surface comprising a plastic, like PE (polyethene or polyethylene) or UHMWPE (Ultra-high-molecular-weight polyethylene).

10. The conveying belt assembly according to claim 1, wherein the sliding supports comprise an air bearing.

11. The conveying belt assembly according to claim 1, wherein the driving roller is arranged opposite the downstream sliding support for cooperation with the downstream sliding support.

12. The conveying belt assembly according to claim 1, wherein the friction element is arranged opposite the upstream sliding support for cooperation with the upstream sliding support.

13. A printer device, comprising a conveying belt assembly according to claim 1, and further comprising one or more from the following group:

an inkjet marking module;
a drying and/or fixing unit;
a storage for paper to be printed;
a receptacle for printed paper.

14. Use of the conveying belt assembly according to claim 1 to control the position of a conveyor belt of a printing device.

* * * * *